(12) United States Patent
Yamamoto

(10) Patent No.: US 6,236,467 B1
(45) Date of Patent: May 22, 2001

(54) IMAGE READING DEVICE

(75) Inventor: Yasuhiro Yamamoto, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/114,897

(22) Filed: Jul. 14, 1998

(30) Foreign Application Priority Data

Jul. 16, 1997 (JP) .................................................. 09-207340

(51) Int. Cl.[7] ...................................................... H04N 1/32
(52) U.S. Cl. .......................... 358/442; 358/504; 358/451; 382/101; 375/365
(58) Field of Search .................................... 358/442, 504, 358/451; 382/101; 375/365

(56) References Cited

U.S. PATENT DOCUMENTS 5,189,529 * 2/1993 Ishiwata ................................. 358/451
5,489,769 * 2/1996 Kubo ..................................... 235/462
5,563,955 * 10/1996 Bass et al. ............................ 382/101

* cited by examiner

Primary Examiner—Jerome Grant, II
Assistant Examiner—Kevin Kianni
(74) Attorney, Agent, or Firm—Greenblum & Bernstein, P.L.C.

(57) ABSTRACT

The image reading device has a pre-scanning processor, in which an image recorded in a film is read with a relatively coarse pitch and pixel data corresponding to the image are transmitted to an external computer, and a regular scanning processor, in which the image can be read with a relatively fine pitch and pixel data corresponding to the image can be transmitted to the external computer. In each of the pre-scanning processor and the regular scanning processor, an image correction can be performed. When the image corrections performed in the pre-scanning operation and the regular scanning operation are the same, the pixel data, which have been transmitted in the pre-scanning operation, are not necessarily transmitted to the computer in the regular scanning operation.

18 Claims, 8 Drawing Sheets

IMAGE READING DEVICE

BACKGROUND OF THE INVENTION

1. Field of the Invention

The present invention relates to an image reading device in which an image, recorded in a film, for example, is read by a line sensor, and is transmitted to a computer so that the image is indicated by a display device connected to the computer.

2. Description of the Related Art

Conventionally, there is known an image reading device in which a pre-scanning operation is performed prior to a regular scanning operation. In the pre-scanning operation, an image recorded in a film is read by a line sensor with a relatively coarse pitch and pixel data corresponding to the image are transmitted to a computer, for example, so that the image is indicated on a surface of a display device of the computer. By observing the image, which is obtained by the pre-scanning operation and indicated by the display device, it can be determined whether the regular scanning operation is to be performed.

In the regular scanning operation, the image recorded in the film is read with a pitch finer than that of the pre-scanning operation, and pixel data of the read image are transmitted to the computer. Namely, in the regular scanning operation, the same operations as those of the pre-scanning operation are performed, except that the reading pitch is relatively fine in the regular scanning operation.

The transmittance time, for which the pixel data corresponding to the image are transmitted to the computer, is longer than a reading operation carried out using the line sensor. Therefore, during the transmitting operation, the executions of the other processes are restricted, and thus a high operating efficiency of the image reading device is not possible.

SUMMARY OF THE INVENTION

Therefore, an object of the present invention is to provide an image reading device by which pixel data can be transmitted to a computer, which is provided-outside the image reading device, in a short time in comparison with a conventional device.

According to the present invention, there is provided an image reading device comprising a first image processor, a second image processor and a correction determining processor.

The first image processor reads an image recorded in a read object, applies a first image correction to first pixel data corresponding to the image, and transmits the first pixel data to an external device which is provided outside the image reading device. The second image processor reads the image, applies a second image correction to second pixel data corresponding to the image, and can transmit the second pixel data to the external device. The correction determining processor determines whether the first image correction corresponds to the second image correction. The second image reading processor can prohibit transmission of third pixel data, which are included in the first and second pixel data, to the external device when the correction determining processor determines that the first image correction is the same as the second image correction.

Further, according to the present invention, there is provided an image reading device comprising a first image processor, a second image processor and a correction determining processor.

The first image processor reads an image recorded in a read object, applies a first image correction to first pixel data corresponding to the image, and transmits the first pixel data to an external device which is provided outside the image reading device. The second image processor reads the image, applies a second image correction to second pixel data corresponding to the image, and can transmit the second pixel data to the external device. The correction determining processor determines whether the first image correction corresponds to the second image correction. The external device applies an image process to the first pixel data when the correction determining processor determines that the first image correction is the same as the second image correction.

Furthermore, according to the present invention, there is provided an image reading device comprising a first image processor, a second image processor and a reading pitch setting processor.

The first image processor reads an image recorded in a read object with a first reading pitch, and transmits first pixel data corresponding to the image to an external device which is provided outside the image reading device. The second image processor reads the image with a second reading pitch, and transmits second pixel data corresponding to the image to the external device. The reading pitch setting processor sets the first and second reading pitches. The second image processor can prohibit transmission of third pixel data, which are included in the first and second pixel data, to the external device when the second reading pitch is greater than or equal to the first reading pitch.

BRIEF DESCRIPTION OF THE DRAWINGS

The present invention will be better understood from the description of the preferred embodiments of the invention set forth below, together with the accompanying. drawings, in which.

DESCRIPTION OF THE PREFERRED EMBODIMENTS

Figure 1:
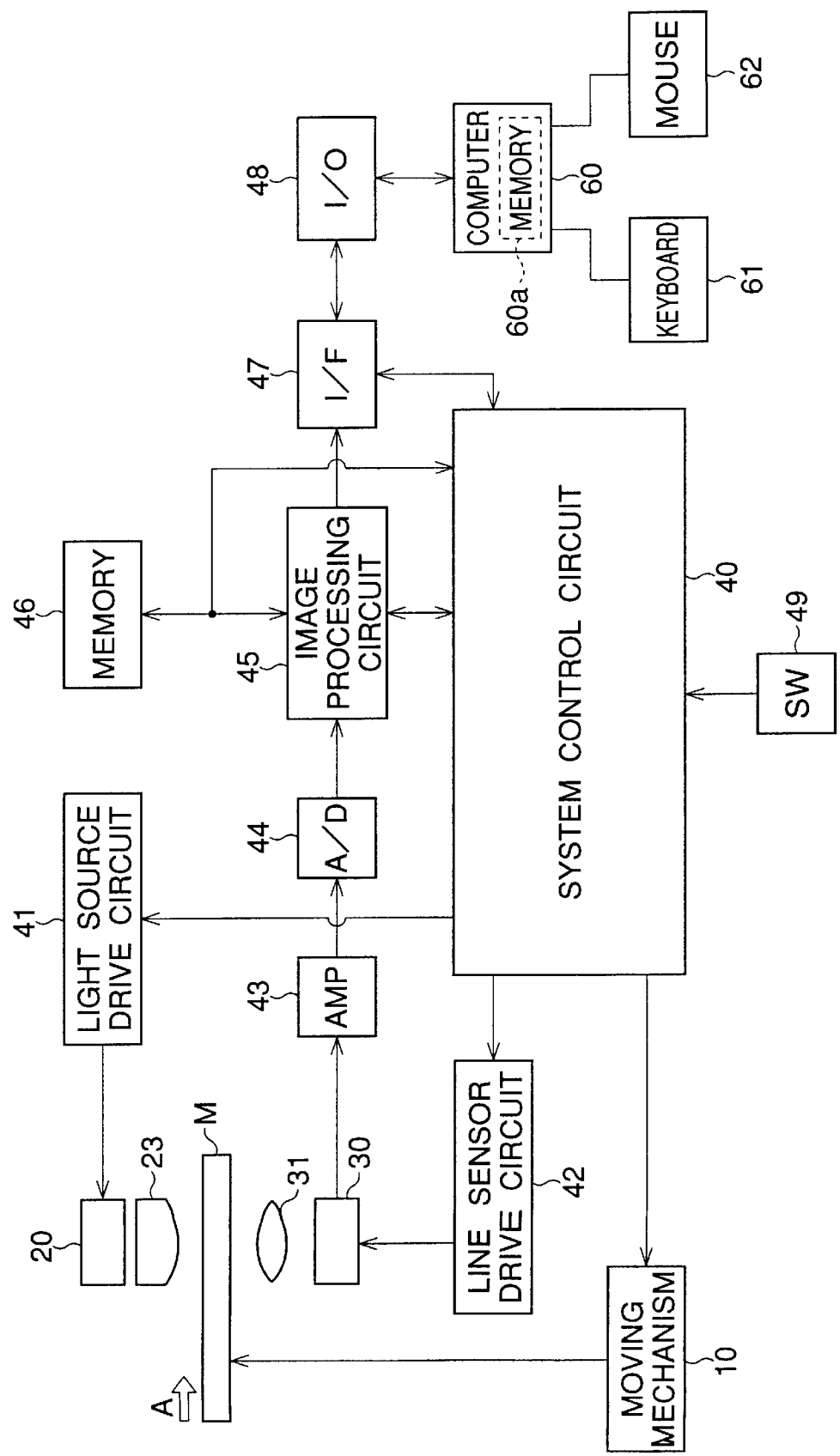
FIG. 1 is a block diagram showing an image reading device of a first embodiment of the present invention.

The present invention will be described below with reference to embodiments shown in the drawings.

FIG. 1 shows an electrical structure of an image reading device of a first embodiment of the present invention.

A read object M, handled by this image reading device, is a transparent negative or positive film on which a color image has been recorded. The film M is intermittently moved, by a moving mechanism 10, in a direction shown by an arrow A.

A light source 20 and a cylindrical lens 23, provided below the light source 20, are disposed above a path along which the film M is moved. A line sensor 30 and a forming lens 31, provided above the line sensor 30, are disposed under the path. The light source 20 is connected to a light, source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e. the pixel data), read through the line sensor 30, is amplified by an amplifier 43 and is converted to a digital signal by an A/D converter 44. The digital pixel data are subjected to an image process, such as a shading correction, in an image processing circuit 45, and are then stored in a memory 46.

The digital pixel data, subsequent to being read from the memory 46, subjected to various correction processes, such as a color correction and a gamma correction. Then, the corrected digital pixel data are converted to a signal, which conforms to a predetermined format, by an interface circuit 47, and are outputted through an input/output terminal 48 to an external computer 60, which is provided outside the image reading device. The computer 60 is provided with a memory 60a, in which the corrected digital pixel data are stored, and a keyboard 61 and a mouse 62 are connected to the computer 60. Using the keyboard 61 or the mouse 62, an image reading operation of the image reading device can be controlled through the computer 60.

Thus, the image reading device and the external computer 60 can communicate with each other through the interface circuit 47 and the input/output terminal 48, so that various control operations can be performed in the image reading device and the external computer 60. The image processing circuit 45 and the interface circuit 47 are controlled by the system control circuit 40.

In this embodiment, although all of the operations can be controlled by the external computer 60, a switch 49 may be connected to the system control circuit 40, so that various operations can be directly performed, such as the image reading operation, for example.

Figure 2:
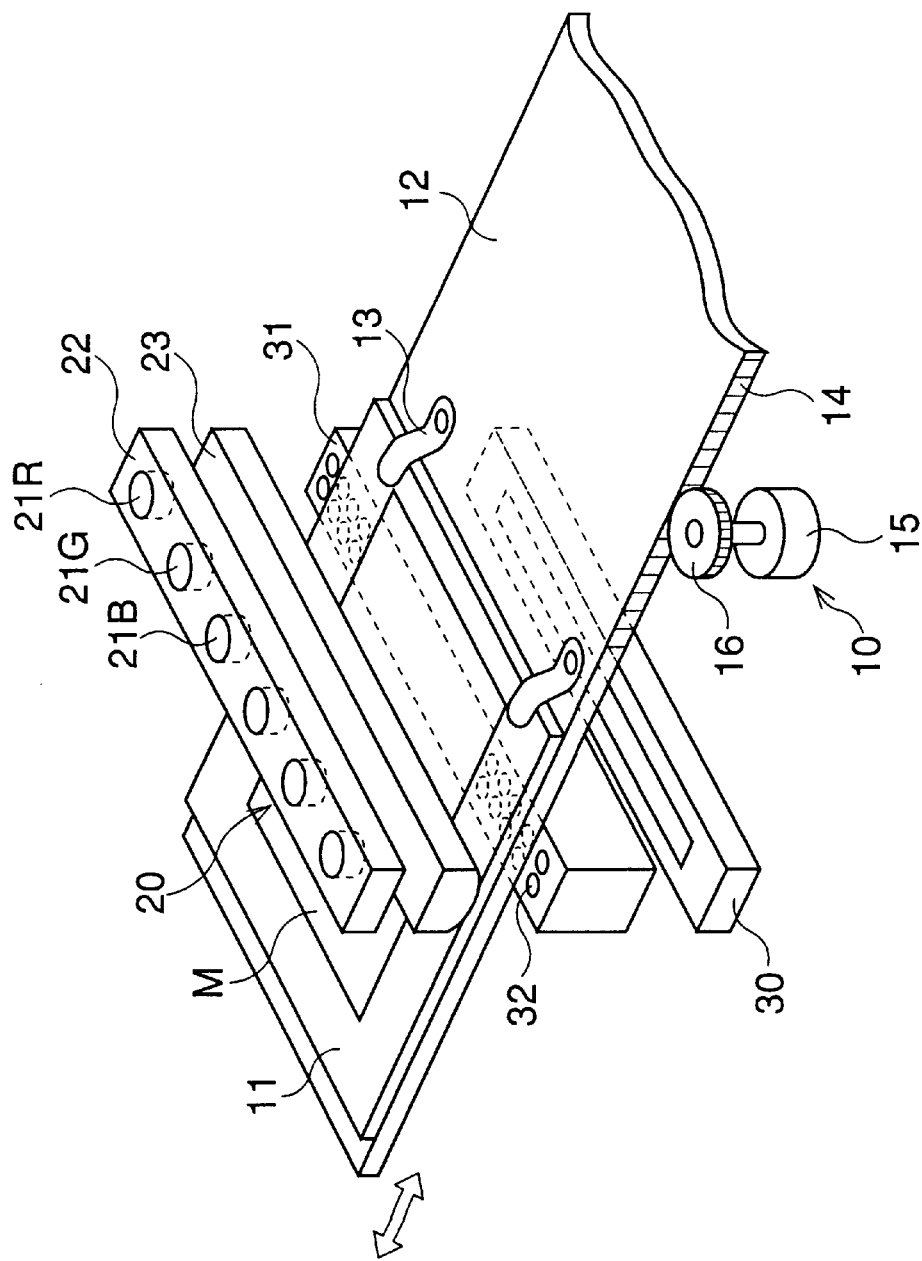
FIG. 2 is a perspective view showing a moving mechanism, a light source and a line sensor, when a transparent film is used.

FIG. 2 shows the moving mechanism 10, the light source 20 and the line sensor 30. The film M is supported by a frame 11, which is fixed on a plate stage 12 by a fastener 13. An opening (not shown) is formed in the stage 12 at a position corresponding to the film M, so that a light beam radiated onto the film M can pass through the film M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position and the moving speed of the film M are controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. This order can be changed in accordance with a necessity.

The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the film M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the film M is moved. The forming lens 31 is provided between the line sensor 30 and the stage 12. The forming lens 31, composed of a rod lens array 32, extends parallel to the line sensor 30. Accordingly, when a light beam is emitted onto the film M, by the light source 20, the image recorded in the film M is formed on the light receiving surface of the line sensor 30, through the forming lens 31.

Figure 3:
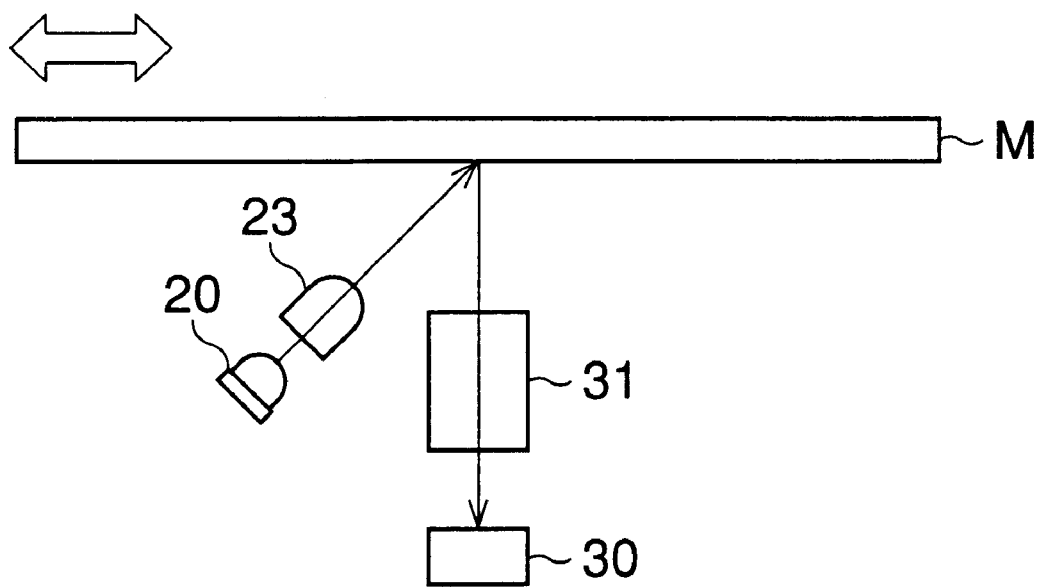
FIG. 3 is a view showing a structure, including a light source and a line sensor, used for reading an image recorded on a read object from which a light beam is reflected.

FIG. 3 shows an alternative structure, that includes the light source 20 and the line sensor 30, used for reading an image recorded on a read object M from which a light beam is reflected. In this structure, the light source 20, the cylindrical lens 23, the line sensor 30 and the forming lens 31 are disposed under the read object M. Namely, a light beam outputted from the light source 20 is irradiated on the lower surface of the read object M, so that the light beam reflected by the read object M enters the line sensor 30 through the forming lens 31.

Figure 4:
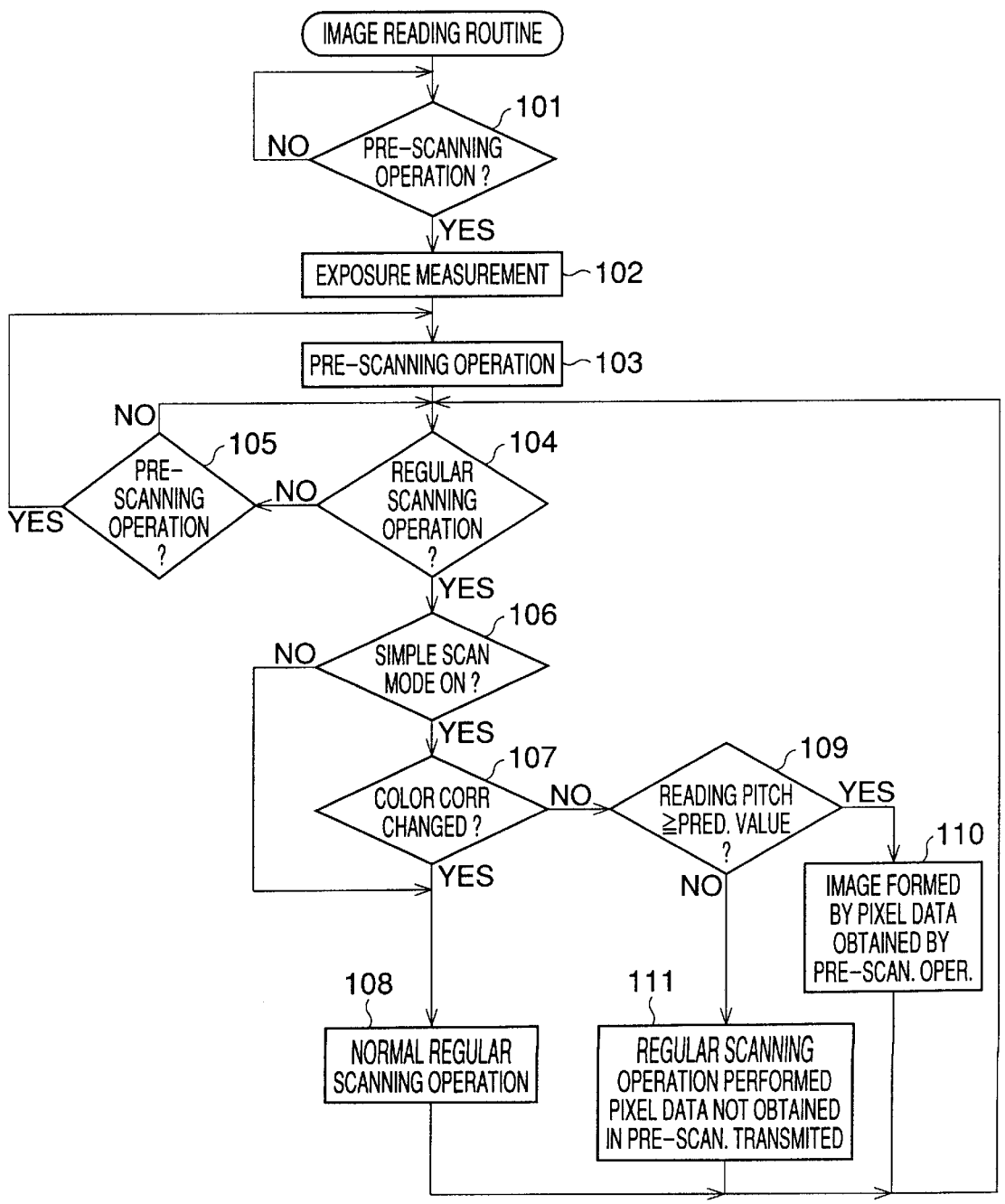
FIG. 4 is a flowchart of an image reading routine executed in the image reading device of the first embodiment.
Figure 5:
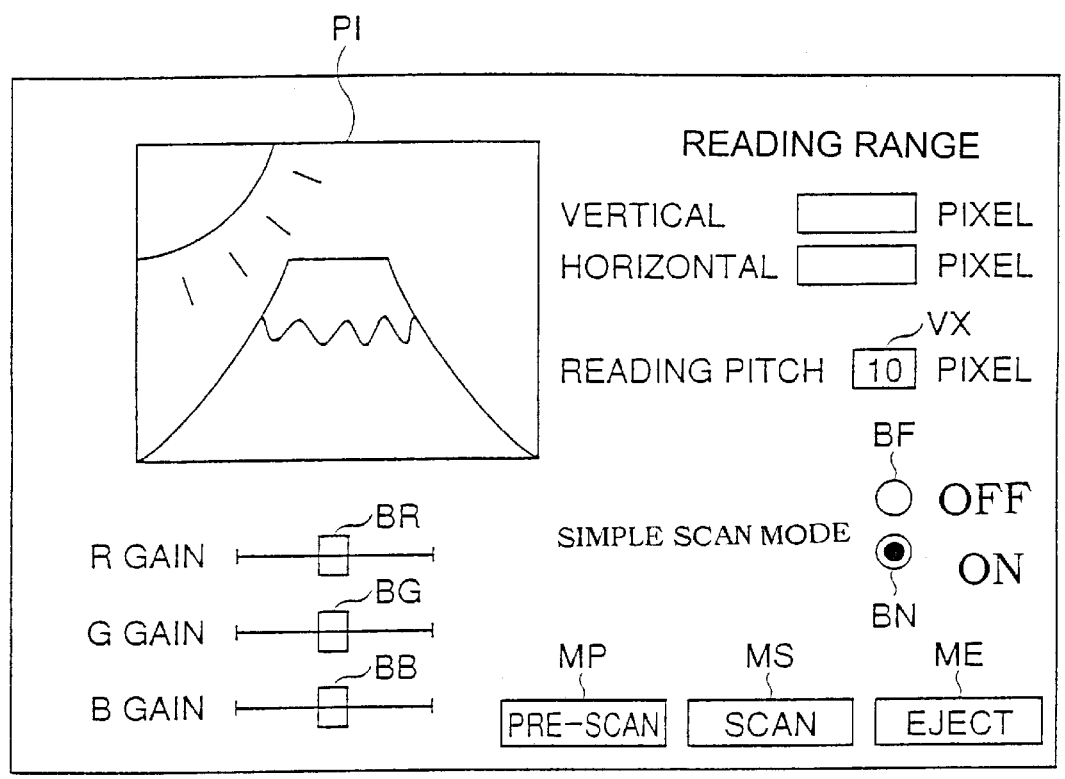
FIG. 5 is a view showing an example of a surface of a display device of a computer.

FIG. 4 is a flowchart of an image reading routine executed in the image reading device. FIG. 5 shows an example of a surface of the display device of the computer 60. With reference to FIGS. 1, 2, 4 and 5, an operation of the image reading device is described below. Note that the operation of the image reading device is controlled by clicking on a predetermined label indicated on the surface of the display device, using the mouse 62, for example.

In step 101, it is determined whether a pre-scanning operation is to be performed. A label "MP", denoting the pre-scanning operation and indicated on the surface of the display device, is clicked and the process goes from Step 101 to Step 102, so that an exposure measurement is carried out. Namely, while the light source 20 is turned ON, the film M is intermittently moved, via the moving mechanism 10, with a pitch which is coarser than that of a normal regular scanning operation performed in Step 108. During the intermittent movement, the line sensor 30 is exposed for a predetermined exposure time, so that pixel data of one frame image are detected. Note that, in the exposure measurement, the light source 20 is controlled in such a manner that the light-emitting diodes 21R, 21G and 21B are illuminated in a predetermined order every time the stage 12 is stopped, so that R, G and B pixel data are obtained. In the exposure measurement, based on the output signal (i.e. the pixel data) of the line sensor 30, an optimum exposure time is obtained in such a manner that the level of the output signal of the line sensor 30 becomes optimum. The optimum exposure measurement is well-known, and thus not described herein.

In Step 103, a pre-scanning operation is performed in accordance with the optimum exposure time obtained in Step 102. In the pre-scanning operation, the film M is set at an initial position in which an end portion of the film M faces the light source 20, and then the image recorded in the film M is read with a reading pitch, which is coarser than that of the normal regular scanning operation which is performed in Step 108. The reading pitch in the pre-scanning operation may be coarse not only in a moving direction of the film M, but also in the longitudinal direction of the line sensor 30. When the reading pitch of the pre-scanning operation is ten pixels, for example, not only does the moving pitch of the film M becomes ten times that of the normal regular scanning operation, but also the pixel pitch, with which one line of pixel data is read from the memory 46, becomes ten times that of the normal regular scanning operation, due to thinning of the pixel data. Namely, the value of the reading pitch corresponds to the total amount of effective pixel data (i.e. the amount of data used in constructing a single image), which is determined in accordance with the amount of movement of the line sensor 30 and the thinning of the pixel data read from the memory 46.

In the pre-scanning operation, the light-emitting diodes 21R, 21G and 21B are illuminated in a predetermined order every time the stage 12 is stopped, so that R, G and B pixel data are detected line by line. All of the pixel data outputted from the line sensor 30 are analog-to-digital converted by the A/D convertor 44 and subjected to a shading correction, before being stored in the memory 46. The memory 46 has a recording area, which is large enough to store all of the digital pixel, which are obtained when the image is read with the minimum reading pitch of the image reading device.

The pixel data stored in the memory 46 are read therefrom line by line. At this time, all of the pixel data of one line are not read, but the pixel data are read with a predetermined pixel pitch (10 pixels, for example), which corresponds to the respective reading pitch. The read pixel data, which have been read from the memory 46, are subjected to correction processes, such as a color correction and a gamma correction, and are transmitted to the computer 60, which stores the corrected pixel data in the memory 60a. Thus, an image PI obtained by the pre-scanning operation is indicated on a surface of the display device of the computer 60, together with various labels or icons.

In Step 104, it is determined whether a regular scanning operation is to be started. The user of the image reading device can determine whether the regular scanning operation is to be started, by observing the pre-scanned image PI indicated on the surface of the display device. When a label "MS" of the regular scanning operation, indicated on the surface of the display device of the computer 60, is clicked, the process goes from Step 104 to Step 106, so that a preparation for the regular scanning operation is carried out. Conversely, when the regular scanning operation is not to be started, Step 105 is executed in which it is determined whether the pre-scanning operation is again to be performed. When the label "MP" of the pre-scanning operation is clicked, the process goes back to Step 103, and when the label "MW" is not clicked, the process goes back to Step 104. Namely, while neither of the labels "MS" nor "MP" is clicked, Steps 104 and 105 are repeatedly executed.

In Step 106, based on a setting condition of the labels BF and BN, which imply an ON-OFF condition of a simple scan mode, it is determined whether the simple scan mode has been selected. The simple scan mode implies that, in the computer 60, it is possible for the pixel data obtained in the pre-scanning operation and stored in memory 60a to be utilized as being a part of the pixel data obtained in the regular scanning operation.

When the label BF, indicating that the simple scan mode is "OFF", is set to a black state as shown in FIG. 5, i.e. when the simple scan mode has not been selected, Step 108 is executed in which the normal regular scanning operation is performed. The normal regular scanning operation is basically the same operation as that of the pre-scanning operation, except that the reading pitch and the pixel pitch of the line sensor 30 are relatively fine in comparison with the pre-scanning operation. Namely, the pixel data, read by the normal regular scanning operation from the film M, are subjected to A/D conversion, a color correction and a gamma correction, and then transmitted to the computer 60, so that the image is indicated on the surface of the display device of the computer 60. The image reading routine then returns to Step 104.

Conversely, when it is determined in Step 106 that the label BN, indicating that the simple scan mode is "ON", is set to a black state, i.e. when the simple scan mode has been selected, it is determined in Step 107 whether parameters of the color correction have been changed. The parameters of the color correction are changed by moving the buttons BR, BG and BB, which set gains of R, G and B components, either rightward or leftward. The R, G and B gains become large by moving the buttons BR, BG and BB in the right direction on the surface, and become small by moving the buttons BR, BG and BB in the left direction. For example, when the button BR of the R component is moved rightward, the gain of the R component becomes large.

When it is determined in Step 107 that the parameters of the color correction have been changed, since the pixel data obtained in the regular scanning operation of the film M would now be different from that of the pre-scanning operation, the pixel data of the pre-scanning operation cannot be utilized as a part of the pixel data read by the regular scanning operation to indicate the image on the surface of the display device. Therefore, in this case, Step 108 is executed so that the normal regular scanning operation is performed.

Conversely, when it is determined in Step 107 that the parameters of the color correction have not been changed, the pixel data obtained via the pre-scanning operation can be utilized as a part of the pixel data obtained by the regular scanning operation. Therefore, in this case, Step 109 is executed so that the simple scan mode is carried out. In Step 109, it is determined whether the reading pitch of the regular scanning operation of the simple scan mode is greater than or equal to the reading pitch of the pre-scanning operation. The reading pitch of the regular scanning operation corresponds to a value VX, being "READING PITCH", indicated on the surface of the display device, and can be set by using the keyboard 61 or the mouse 62.

When the reading pitch of the pre-scanning operation is greater than or equal to a predetermined value, i.e. when the regular scanning operation is to be performed with a pitch which is coarser than that of the pre-scanning operation, the pixel data obtained by the regular scanning operation is either already contained in the pixel data obtained via the pre-scanning operation, or can be generated based on the pixel data already obtained via the pre-scanning operation. Therefore, in this case, Step 110 is executed in which an image, which is to be indicated on the surface of the display device, is formed using only the pixel data transmitted to the computer 60 and stored in the memory 60a in the pre-scanning operation. The image reading routine then returns to Step 104, so that the processes described above are executed again.

Note that, in Step 110, the image reading device outputs a recognition signal to the computer 60, the recognition signal indicating that the pixel data, which have been transmitted to the computer 60 in the pre-scanning operation (Step 103), are to be used as pixel data of the regular scanning operation. Thus, in the computer 60, when receiving the recognition signal, the image corresponding to the regular scanning operation is generated based on the pixel data inputted in the pre-scanning operation. Namely, in the image reading device, when the reading pitch is greater than or equal to the predetermined value (YES in Step 109), the reading operation and the transmitting operation are not performed (Step 110).

Conversely, when it is determined in Step 109 that the reading pitch of the regular scanning operation is smaller than that of the predetermined value, i.e. when the regular scanning operation is to be performed with a pitch which is finer than that of the pre-scanning operation, Step 111 is executed. Namely, the regular scanning operation is performed, so that pixel data are detected, and digital pixel data, which are not included in the former digital pixel data stored in the memory 60a during the pre-scanning operation, are transmitted to the computer 60.

In other words, when first pixel data are detected in the pre-scanning operation and second pixel data are detected in the regular scanning operation, third pixel data, which are included in both the first and second pixel data, are prohibited from being transmitted to the computer 60. Thus, in the image reading device, a recognition signal, indicating that only the second pixel data, excluding the third pixel data, are outputted, is transmitted to the computer 60 together with the second pixel data, excluding the third pixel data, and in the computer 60, based on the recognition signal, an image is generated using the first pixel data, which have been inputted in the pre-scanning operation, and the second pixel data, which are inputted in the regular scanning operation.

In the computer 60, using the pixel data transmitted in the regular scanning operation and the pixel data transmitted in the pre-scanning operation, an image, which is to be indicated on the surface of the display device, is formed. The image reading routine then returns to Step 104, so that the processes described above are executed again.

Note that, if a label "ME", which is indicated on the surface of the display device to imply an ejecting operation, is clicked, the image reading routine ends due to an interruption operation, and the film M is ejected from the image reading device.

Figure 6:
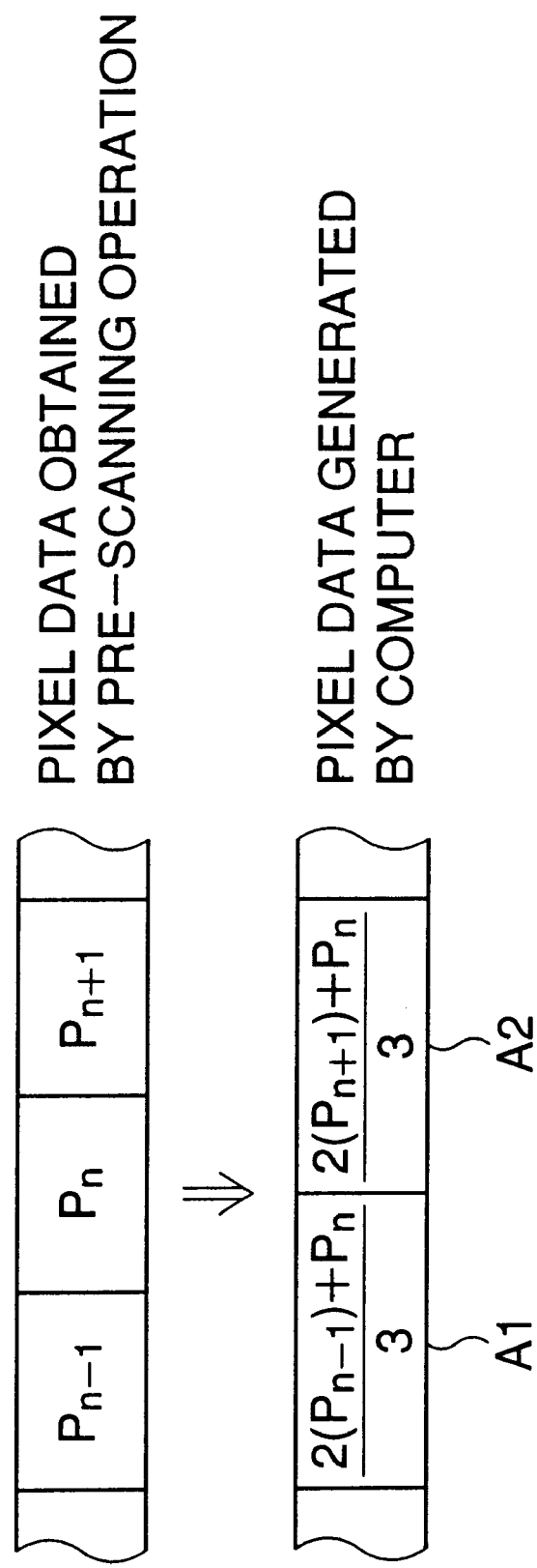
FIG. 6 is a view showing a method in which, in the computer, pixel data forming an image indicated on the surface of the display device are generated based on pixel data obtained by a pre-scanning operation.

FIG. 6 shows a method in which, in the computer 60, pixel data forming an image indicated on the surface of the display device are generated based on pixel data obtained by the pre-scanning operation, and which corresponds to Step 110 shown in FIG. 4.

In this example, the pre-scan reading pitch (i.e. first reading pitch) of the pre-scanning operation is 10 pixels, and the regular-scan reading pitch (i.e. second reading pitch) of the regular scanning operation is 15 pixels. Namely, the regular-scan reading pitch is larger or coarser than the pre-scan reading pitch.

Thus, initially, due to the difference between the pre-scan reading pitch and the regular-scan reading pitch, an interpolation routine is performed by the computer 60 to determine pixel data values, at pixel pitch locations identical to those of the pre-scanning operation (i.e. a pixel pitch by 10 pixels), that would be obtained from a line of detected pixel data of the regular scanning operation, read at reading pitch location that vary from those of the pre-scanning operation.

Then, in the image indicated on the surface of the display device, the value of a displayed pixel A1 is obtained by following a formula based on a first pixel $P_{n-1}$ and a second pixel $P_n$, which is positioned adjacent to the first pixel $P_{n-1}$, the first and second pixels $P_{n-1}$ and $P_n$ being obtained either via the pre-scanning operation or the interpolation routine. The formula being:

$$(2(P_{n-1})+P_n)/3$$

Namely, the displayed pixel A1 corresponds to the first pixel $P_{n-1}$ and the left half of the second pixel $P_n$, in FIG. 6.

Similarly, the value of a displayed pixel A2, which is positioned adjacent to the displayed pixel A1, is obtained by following a formula based on the second pixel $P_n$ and a third pixel $P_{n+1}$, which is positioned adjacent to the second pixel $P_n$, the second and third pixels $P_n$ and $P_{n+1}$ being obtained either via the pre-scanning operation or the interpolation routine. The formula being:

$$(2(P_{n+1})+P_n)/3$$

Namely, the displayed pixel A2 corresponds to the third pixel $P_{n+1}$ and the right half of the second pixel $P_n$ in FIG. 6.

Figure 7:
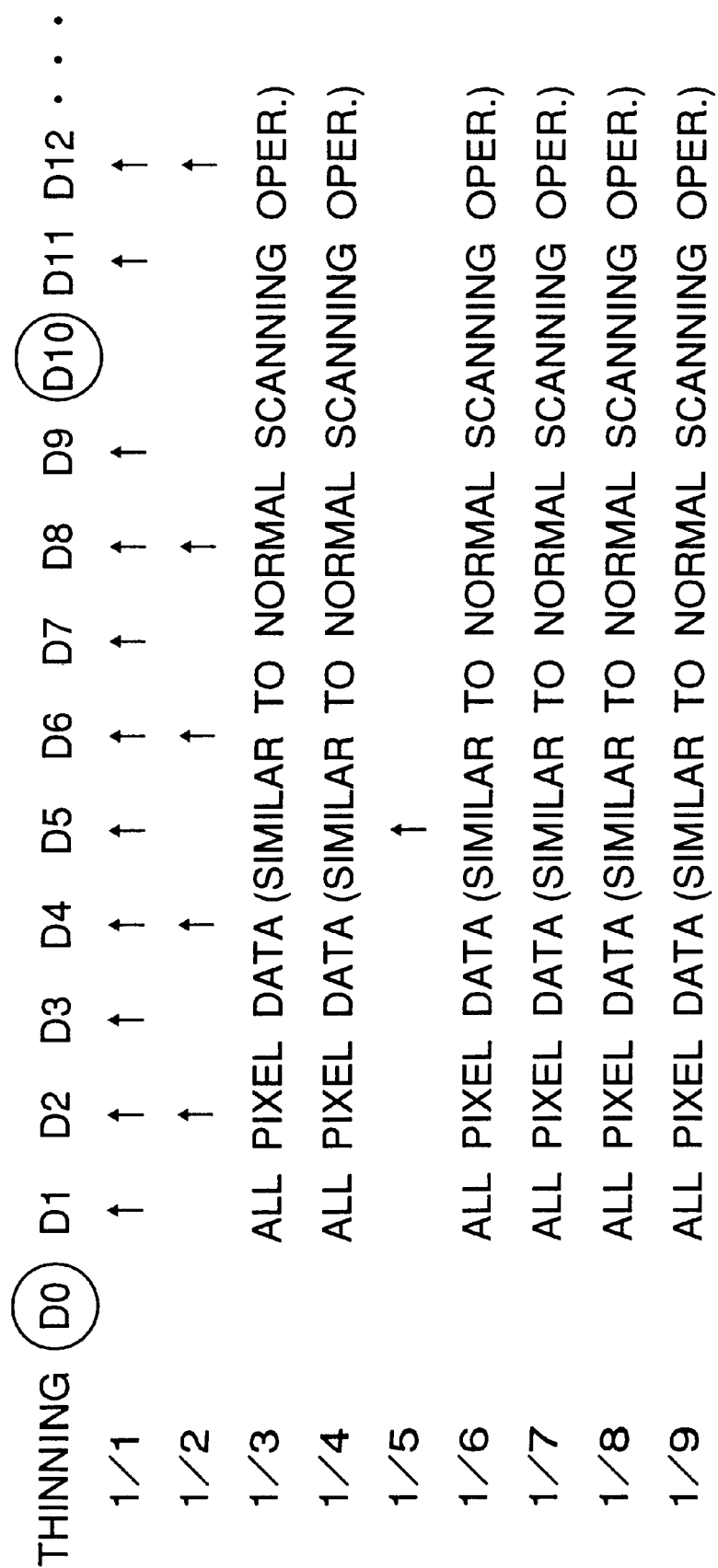
FIG. 7 is a view showing a relationship between the pixel data, which are stored in a memory, and pixel data, which are read in a regular scanning operation and transmitted to the computer.

FIG. 7 corresponds to Step 111 shown in FIG. 6, and shows a relationship between pixel data, which are stored in the memory 46 in the pre-scanning operation and the regular scanning operation, and pixel data, which are read from the memory 46, in the regular scanning operation and transmitted to the computer 60 in the regular scanning operation. In FIG. 7, D0, D1, D2, . . . show addresses of the memory 46, and pixel data, stored in an address enclosed by a circle, are transmitted to the computer 60 in the pre-scanning operation, i.e. thinning is performed. Namely, in this example, the pixel pitch, being in the longitudinal direction of the line sensor 30, in the pre-scanning operation is 10 pixels.

When the thinning of the regular scanning operation is set to 1/1, i.e. when the reading pitch, and thus also the pixel pitch, is one pixel, regarding the addresses D0 through D10 of the memory 46, only the pixel data stored in the addresses D1, D2, D3, . . . D9 of the first line of detected pixel data are transmitted to the computer 60, since the pixel data stored in the addresses D0 and D10 of the first line of detected pixel data have been transmitted in the pre-scanning operation. Conversely, all of the digital pixel data of the second through tenth lines are transmitted to the computer 60. Then, similar to the first line, in the eleventh line of detected pixel data stored in the memory 46, only the digital pixel data stored in address D1 through D9 are transmitted.

When the thinning of the regular scanning operation is 1/2, i.e. when the reading pitch and pixel pitch are two pixels, regarding the addresses D0 through D10 of the memory 46, only the pixel data stored in the addresses D2, D4, D6 and D8 are transmitted to the computer 60. When the thinning of the regular scanning operation is 1/5, i.e. when the reading pitch and pixel pitch are five pixels, regarding the addresses D0 through D10 of the memory 46, only the pixel data stored in the address D5 is transmitted to the computer 60.

Conversely, when the thinning of the regular scanning operation is 1/3, 1/4, 1/6, 1/7, 1/8 and 1/9, all of the pixel data stored in the memory 46, due to the regular scanning operation, are transmitted to the computer 60, in a similar way as the normal regular scanning operation, performed in Step 108. This is because the amount of the pixel data, which are common to the pre-scanning operation and the regular scanning operation, is minimal.

As described above, in the first embodiment, when the contents of the image corrections, such as a color correction in the regular scanning operation, are the same as those of the pre-scanning operation, an image, which is indicated on a surface of the display device, can be generated, using the pixel data, previously stored in the memory 46 during the pre-scanning operation, by the computer 60. Further, when a reading pitch, which is set prior to the regular scanning operation, is greater than or equal to that of the pre-scanning operation, the pixel data need not be read, corrected and transmitted a second time.

Accordingly, the amount of the pixel data, which are transmitted from the image reading device to the external device, such as the computer 60, in order to indicate an image obtained by the regular scanning operation on a surface of a display device of the external device, can be reduced. Namely, according to the first embodiment, by reducing the transmitting operation time, a period for which various kinds of image processes are carried out, can be maximized, and thus the rate of operation of the image reading device can be improved.

Figure 8:
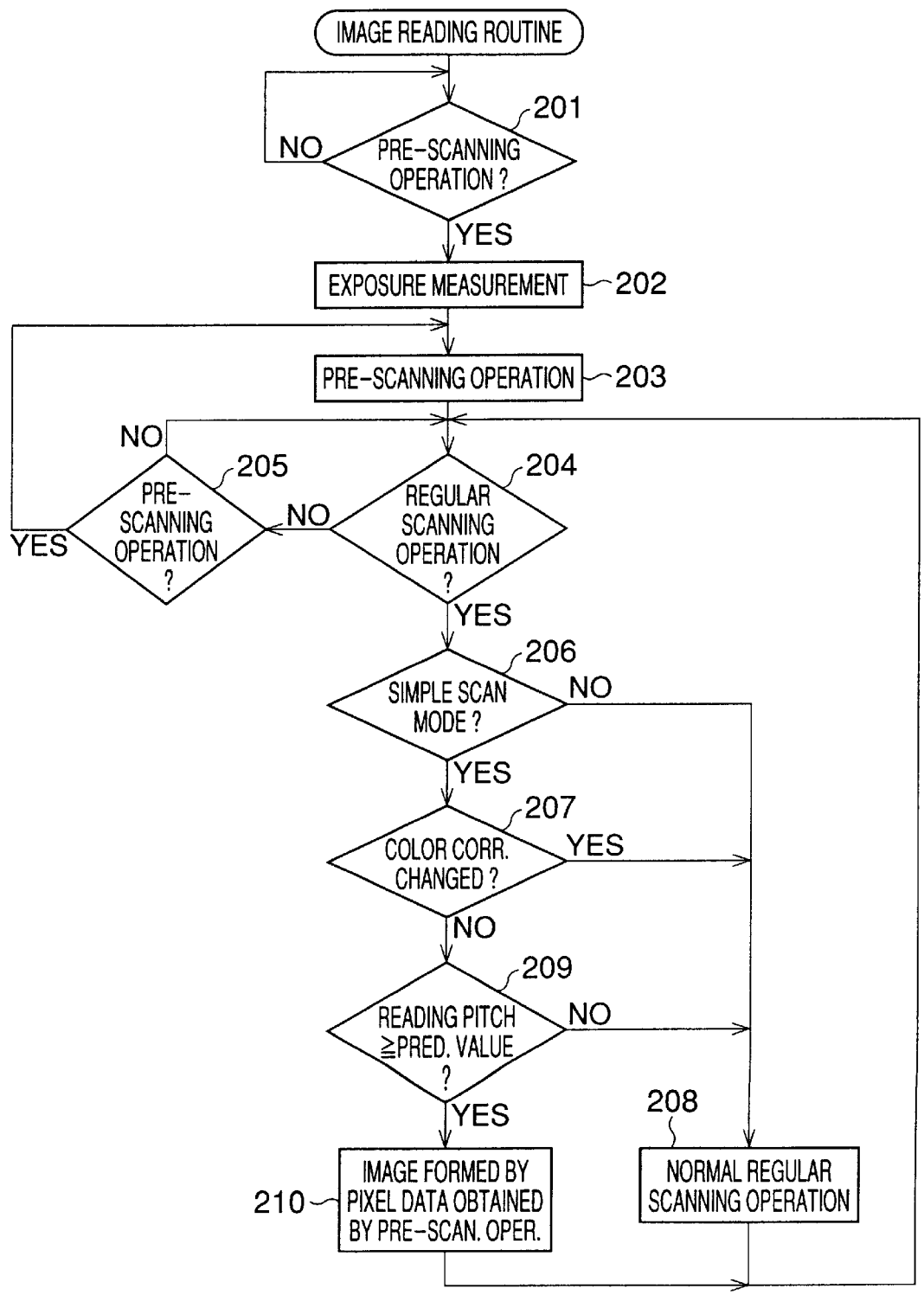
FIG. 8 is a flowchart of an image reading routine executed in an image reading device of a second embodiment.

FIG. 8 is a flowchart of an image reading routine executed in a second embodiment of the image reading device. For each of the reference numerals of the Steps in FIG. 8, "100" has been added to the reference numeral of the corresponding Step in the flowchart of FIG. 4. For example, Step 201 corresponds to Step 101 of the flowchart shown in FIG. 4.

The image reading routine shown in FIG. 8 is applied to a case in which a filter process (a calculation process), such as a low-pass filter, is performed on pixel data obtained by a pre-scanning operation. In this construction, when the reading pitch in the simple scanning mode is less than that of the pre-scanning operation, the filtered digital pixel data, which have been subjected to the filter process, cannot be used as they are. Therefore, in this case, the process goes from Step 209 to Step 208, so that the normal regular scanning operation is performed, and thus the filter process is applied to pixel data obtained in the normal regular scanning operation. Namely, in the image reading routine of FIG. 8, as understood from the comparison with the flowchart shown in FIG. 4, a process corresponding to Step 111 is omitted.

In the second embodiment, the other processes are the same as those of the first embodiment. Namely, the calculation of the image data to be displayed described with reference to FIG. 6, and the transmitting operation described with reference to FIG. 7 are similarly utilized.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-207340 (filed on Jul. 16, 1997) which is expressly incorporated herein, by reference, in its entirety.

What is claimed is:

1. An image reading device comprising:

an image processor that, in a first mode, reads an image recorded in a read object, applies a first image correction to first pixel data corresponding to said image, and transmits said first pixel data to an external device which is provided outside said image reading device and, in a second mode, reads said image, applies a second image correction to second pixel data corresponding to said image, and can transmit said second pixel data to said external device; and a correction determining processor that determines whether said first image correction is the same as said second image correction;

said image reading processor being able, in said second mode, to prohibit transmission of third pixel data, which are included in said first and second pixel data, to said external device when said correction determining processor determines that said first image correction is the same as said second image correction.

2. A device according to claim 1, wherein in said second mode, said image processor can prohibit the transmission of said second pixel data, when said correction determining processor determines that said first image correction is the same as said second image correction.

3. A device according to claim 1, wherein, in said second mode, said image processor can prohibit the reading of said image.

4. A device according to claim 1, wherein, in said first mode, said image processor reads said image with a first reading pitch, and in said second mode, said image processor reads said image with a second reading pitch, said image processor prohibiting the transmission of said second pixel data when said second reading pitch is greater than or equal to said first reading pitch.

5. A device according to claim 1, wherein, in said first mode, said image processor reads said image with a first reading pitch, and in said second mode, said image processor reads said image with a second reading pitch, said image processor prohibiting the reading of said image when said second reading pitch is greater than or equal to said first reading pitch.

6. The image reading device according to claim 1, said first mode comprising a prescan mode, said second mode comprising a scanning mode.

7. The image reading deice according to claim 1, said image processor reading a same image when in a first mode as when in said second mode.

8. The image reading device according to claim 1, said external device comprising a computer having a display device.

9. An image reading device comprising:

an image processor that, in a first mode, reads an image recorded in a read object, applies a first image correction to first pixel data corresponding to said image, and transmits said first pixel data to an external device which is provided outside said image reading device and, in a second mode, reads said image recorded in said read object, applies a second image correction to second pixel data corresponding to said image, and can transmit said second pixel data to said external device; and a correction determining processor that determines whether said first image correction corresponds to said second image correction;

said external device applying an image process to said first pixel data when said correction determining processor determines that said first image correction corresponds to said second image correction;

wherein in said first mode, said image processor reads said image with a first reading pitch, and in said second image mode, said processor reads said image with a second reading pitch, said external device applying said image process only to said first pixel data when said second reading pitch is greater than or equal to said first reading pitch.

10. A device according to claim 9, wherein said external device applies said image process only to said first pixel data when said correction determining processor determines that said first image correction corresponds to said second image correction.

11. A device according to claim 9, wherein said external device applies said image process to said first pixel data and said second pixel data when said correction determining processor determines that said first image correction corresponds to said second image correction.

12. A device according to claim 9, wherein said external device is a computer provided with a display device.

13. A device according to claim 12, wherein said image process includes an image indicating operation in which said image is indicated by said display device.

14. An image reading device comprising:

an image processor that, in a first mode, reads an image recorded in a read object with a first reading pitch, and transmits first pixel data corresponding to said image to an external device provided outside said image reading device and that, in a second mode, reads said image with a second reading pitch, and transmits second pixel data corresponding to said image to said external device; and a reading pitch setting processor that sets said first and second reading pitches;

said image processor being able to prohibit transmission of third pixel data, included in said first and second pixel data, to said external device when said second reading pitch is greater than or equal to said first reading pitch.

15. A device according to claim 14, wherein, in said second mode, said image processor prohibits the transmission of said second pixel data when said second reading pitch is greater than or equal to said first reading pitch.

16. A device according to claim 14, wherein, in said second mode, said image processor prohibits the reading of said second pixel data when said second reading pitch is greater than or equal to said first reading pitch.

17. The image reading device according to claim 14, said external device comprising a computer having a display device.

18. An image reading device comprising:

an image processor that, in a first mode, reads an image recorded in a read object, applies a first image correction to first pixel data corresponding to said image, and transmits said first pixel data to an external device which is provided outside said image reading device and that, in a second mode, reads said image, applies a second image correction to second pixel data corresponding to said image, and can transmit said second pixel data to said external device;

a correction determining processor that determines whether said first image correction corresponds to said second image correction;

said external device applying an image process to said first pixel data when said correction determining processor determines that said first image correction corresponds to said second image correction; and wherein in said first mode, said image processor reads said image with a first reading pitch, and, in said second mode said image processor reads said image with a second reading pitch, said external device applies said image process to said first pixel data and said second pixel data when said correction determining processor determines that said first image correction corresponds to said second image correction.

* * * * *